(12) United States Patent
Cannas et al.

(10) Patent No.: US 9,938,370 B2
(45) Date of Patent: Apr. 10, 2018

(54) CURABLE COMPOSITION BASED ON POLYMERS CONTAINING SILANE GROUPS AND ON A ZINC CATALYST

(71) Applicant: SIKA TECHNOLOGY AG, Baar (CH)

(72) Inventors: Rita Cannas, Dübendorf (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 131 days.

(21) Appl. No.: 14/897,022

(22) PCT Filed: Jun. 5, 2014

(86) PCT No.: PCT/EP2014/061721
§ 371 (c)(1),
(2) Date: Dec. 9, 2015

(87) PCT Pub. No.: WO2014/198633
PCT Pub. Date: Dec. 18, 2014

(65) Prior Publication Data
US 2016/0152760 A1 Jun. 2, 2016

(30) Foreign Application Priority Data

Jun. 11, 2013 (EP) ..................................... 13171554

(51) Int. Cl.
| | | |
|---|---|---|
| *C08G 18/22* | (2006.01) | |
| *C08G 18/83* | (2006.01) | |
| *C08G 65/336* | (2006.01) | |
| *C08G 77/46* | (2006.01) | |
| *C08L 71/02* | (2006.01) | |
| *C08L 83/12* | (2006.01) | |
| *C08L 101/10* | (2006.01) | |

(52) U.S. Cl.
CPC ......... *C08G 18/222* (2013.01); *C08G 18/837* (2013.01); *C08G 65/336* (2013.01); *C08L 71/02* (2013.01); *C08L 83/12* (2013.01); *C08L 101/10* (2013.01); *C08G 77/46* (2013.01)

(58) Field of Classification Search
CPC .. C08G 18/222; C08G 18/837; C08G 65/336; C08G 77/46; C08L 71/02; C08L 101/10; C08L 83/12
See application file for complete search history.

(56) References Cited

U.S. PATENT DOCUMENTS

| 2011/0028647 A1 | 2/2011 | Sixt et al. |
| 2011/0046304 A1 | 2/2011 | Maliverney |

FOREIGN PATENT DOCUMENTS

| CN | 103987719 A | 8/2014 |
| EP | 0354138 A1 | 2/1990 |
| EP | 0 508 119 A2 | 10/1992 |
| EP | 0 649 878 A2 | 4/1995 |
| EP | 1964872 A1 | 9/2008 |
| EP | 2289972 A1 | 3/2011 |
| EP | 2290007 A1 | 3/2011 |
| EP | 2 388 297 A1 | 11/2011 |
| JP | H09-208547 A | 8/1997 |
| JP | H09-220853 A | 8/1997 |

OTHER PUBLICATIONS

Jan. 5, 2017 Office Action issued in Chinese Patent Application No. 201480033343.6.
Mar. 31, 2017 Office Action issued in Australian Patent Application No. 2014280342.
Nov. 21, 2014 Search Report issued in International Patent Application No. PCT/EP2014/061721.

*Primary Examiner* — Patrick D Niland
(74) *Attorney, Agent, or Firm* — Oliff PLC

(57) ABSTRACT

Composition including at least one polymer containing silane groups and at least one zinc(II) complex compound of $Zn_k(L)_x(Y)_{2k-nx}$, where k is an integer from 1-10, x is 1, 2, 3, or 4, n corresponds to

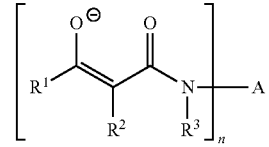

of ligand L, Y is ligand having −1 charge, and L is ligand of

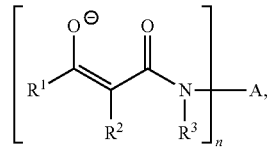

where n is 1, 2, or 3, A is $R^4$ or polyoxyalkylene group or group of polyoxyalkylated compound optionally having one or two terminal 1,3-ketoamide groups, $R^1$ and $R^2$ are hydrogen residue or monovalent saturated or unsaturated hydrocarbon group having 1-10 carbon atoms independently of each other or jointly bivalent alkylene group having 3-6 carbon atoms; $R^3$ and $R^4$ are hydrogen residue or monovalent saturated hydrocarbon group having 1-12 carbon atoms independently of each other, hydrocarbon group optionally contains one or more heteroatoms, or jointly bivalent alkylene group having 3-6 carbon atoms, which alkylene group optionally contains one or more heteroatoms. The invention further relates to the use of the zinc(II) complex compound of the formula $Zn_k(L)_x(Y)_{2k-nx}$ as a catalyst for the crosslinking of polymers containing silane groups by means of moisture.

15 Claims, No Drawings

CURABLE COMPOSITION BASED ON POLYMERS CONTAINING SILANE GROUPS AND ON A ZINC CATALYST

TECHNICAL FIELD

The invention relates to curable compositions based on polymers containing silane groups and on a zinc catalyst and to the use of the zinc catalyst for such compositions, and also to the use of the composition, and to products obtainable therefrom.

STATE OF THE ART

Polymers containing silane groups, which are also referred to as "silane-functional polymers" or "silane-modified polymers" (SMP) or "silane-terminated polymers" (STP), react under the influence of moisture via crosslinking of the silane groups to give polymers and play an important role as binders in curable compositions which are used in many industrial applications, for example as sealants, adhesives and coatings. The crosslinking reaction proceeds in two stages, wherein the silane groups are first hydrolyzed to silanol groups which then condense to give siloxane groups. Catalysts are usually used to accelerate the curing. These are very often substances of toxicological concern which constitute a potential hazard to users and the environment. This is especially true of the widely used organotin compounds, especially dialkyltin(IV) carboxylates, for example dibutyltin dilaurate, which feature excellent activity in relation to the crosslinking reaction and good hydrolysis resistance, but are a hazard to health and a major hazard to water.

Because of the toxicity of the organotin compounds, increasing efforts have been made recently to replace them with other, less toxic catalysts. For instance, organotitanates, organozirconates and organoaluminates have been used as substitute catalysts. However, these have lower activity in relation to the crosslinking reaction, and so they bring about much slower crosslinking of the polymer containing silane groups and long-lasting residual tack. Moreover, they are not very hydrolysis-resistant, and so the crosslinking rate declines over time and hence restricts the storability of compositions.

EP-A-0354138 and EP-A-1964872 describe the preparation of polydimethylsiloxanes terminated by alkoxysilane groups from polydimethylsiloxanes terminated by hydroxysilyl groups and alkoxysilanes using zinc(II) compounds, such as Zn complexes with 1,3-diketonate and 1,3-ketoesterate ligands, for example zinc(II) bis(acetoacetonate), as catalysts.

EP-A-2290007 and US-A-2011/0046304 relate to the use of zinc(II) compounds for crosslinking of polysiloxanes containing alkoxysilane groups.

EP-A-2289972 describes the use of zinc salts, especially zinc octoate, as catalysts for crosslinking of specific sylated polymers containing urethane groups.

The zinc catalysts used in the documents cited are not very active and hydrolysis-sensitive in relation to the crosslinking reaction either.

SUMMARY OF THE INVENTION

It is an object of the invention to provide a catalyst for the crosslinking of polymers containing silane groups, which overcomes the aforementioned disadvantages from the prior art. More particularly, the catalyst is to offer improved occupational safety and higher environmental protection compared to the crosslinking catalysts known from the prior art, and is to bring about rapid crosslinking of the silane groups, which declines to a minor degree over time, by means of moisture.

It is a further object of the invention to provide a composition based on polymers containing silane groups, which allows a low hazard classification, has good storability and cures rapidly by means of moisture.

These objects were surprisingly achieved through the use of a specific zinc(II) complex as catalyst.

The invention therefore provides for the use of a zinc(II) complex of the formula $Zn_k(L)_x(Y)_{2k-nx}$ where k is an integer from 1 to 10, x is 1, 2, 3 or 4, n corresponds to the value of n in the formula (I) of the ligand L below, Y is a singly negatively charged ligand and L is a ligand of the formula (I)

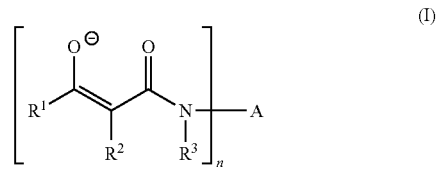

where
n is 1, 2 or 3,
A is $R^4$ or a polyoxyalkylene radical or a radical of a polyoxyalkylated compound optionally having one or two terminal 1,3-ketoamide groups of the formula

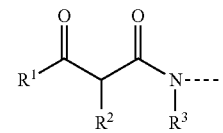

where $R^1$, $R^2$ and $R^3$ are as defined below,
$R^1$ and $R^2$ are each independently a hydrogen radical or a monovalent saturated or unsaturated hydrocarbyl radical having 1 to 10 carbon atoms or together are a divalent alkylene radical having 3 to 6 carbon atoms, and
$R^3$ and $R^4$ are each independently a hydrogen radical or a monovalent saturated hydrocarbyl radical which has 1 to 12 carbon atoms and optionally contains one or more heteroatoms or together are a divalent alkylene radical which has 3 to 6 carbon atoms and optionally contains one or more heteroatoms,
as catalyst for the crosslinking of polymers containing silane groups by means of moisture.

The invention further provides a composition comprising at least one polymer containing silane groups and at least one zinc(II) complex of the formula $Zn_k(L)_x(Y)_{2k-nx}$ as defined above.

It is a particular feature of the inventive use as catalyst that the zinc(II) complex of the formula $Zn_k(L)_x(Y)_{2k-nx}$ is advantageous in relation to occupational safety and environmental protection, since the zinc(II) complex is much less toxic than the catalysts used in the prior art and brings about rapid crosslinking of the silane groups, which barely declines over time, by means of moisture. It is a particular feature of the inventive composition that it allows a low hazard classification, has good storability and cures rapidly by means of moisture.

MODE OF EXECUTION OF THE INVENTION

According to the invention, a zinc(II) complex of the formula $Zn_k(L)_x(Y)_{2k-nx}$ is used as catalyst for the crosslinking of polymers containing silane groups by means of moisture. Moisture relates to the presence of water, air humidity generally being sufficient. The moisture induces the above-elucidated two-stage reaction composed of the hydrolysis of the silane groups to form silanol groups and the subsequent condensation of the silanol groups to give siloxane groups. The condensation reaction leads to crosslinking of the polymer containing silane groups and hence to curing. The cured product is preferably an elastic polymer.

The invention also relates to a composition comprising at least one polymer containing silane groups and at least one zinc(II) complex of the formula $Zn_k(L)_x(Y)_{2k-nx}$ as catalyst. The composition is curable by means of moisture, meaning that the composition can be cured in the presence of moisture via the mechanism described above.

The composition of the invention is illustrated in detail hereinafter. All details also relate correspondingly to the inventive use, especially with regard to the zinc(II) complex of the formula $Zn_k(L)_x(Y)_{2k-nx}$ and the general and preferred embodiments thereof.

In the present document, the term "silane group" refers to a silyl group which is bonded to an organic radical and has one to three, especially two or three, hydrolyzable radicals on the silicon atom. The hydrolyzable radicals are, for example, alkoxy, acetoxy, ketoximato, amido or enoxy radicals. Silane groups having alkoxy radicals are also referred to as "alkoxysilane groups". Correspondingly, the term "silane" refers to an organic compound having at least one silane group.

"Epoxysilane", "hydroxysilane", "(meth)acrylate silane", "isocyanatosilane", "aminosilane" and "mercaptosilane" refer respectively to silanes having one or more epoxy, hydroxyl, (meth)acrylate, isocyanato, amino and mercapto groups on the organic radical in addition to the silane group. "Primary aminosilanes" refer to aminosilanes having a primary amino group, i.e. an $NH_2$ group, bonded to an organic radical. "Secondary aminosilanes" refer to aminosilanes having a secondary amino group, i.e. an NH group, bonded to two organic radicals.

"Hydrosilane" refers to a silicon-containing organic compound having at least one Si—H bond.

The polymer containing silane groups is especially an organic polymer containing silane groups. The term "polymer containing silane groups" refers to an organic compound which bears at least one silane group and has a linear or branched polymer chain comprising at least three connected, identical or different structural units that derive from polymerizable monomers, for example alkylene oxides, (meth)acrylates or olefins. The polymer chain may, as well as the structural units mentioned, also contain functional groups, for example urethane groups and/or urea groups.

Substance names beginning with "poly", such as polyol or polyisocyanate, refer to substances which, in a formal sense, contain two or more of the functional groups that occur in their name per molecule.

A prepolymer is a polymer which has functional groups and serves as precursor for the formation of a higher molecular weight polymer.

A heteroatom is understood to mean any heteroatom customary in organic chemistry, for example O, N or S.

(Meth)acrylate means methacrylate or acrylate.

A one-pack composition comprises all the constituents in one component. A multipack or two-pack composition comprises two or more components, with one portion of the constituents present in a first component and the other portion of the constituents in a second component or, if more than two components are present, in a plurality of further components, the components being stored separately from one another. In the case of a multipack or two-pack composition, the individual components are generally mixed with one another shortly before use.

A composition is referred to as "storage-stable" or "storable" when it can be kept in a suitable container at room temperature over a prolonged period, typically at least 3 months up to 6 months or more, without any change in its application or use properties, especially the viscosity and crosslinking rate, to a degree of relevance for the use thereof as a result of the storage.

The number-average molecular weight Mn is determined by gel permeation chromatography (GPC) against polystyrene standard.

The silane equivalent weight is reported in g/equivalent or g/eq and can be calculated via the silicon content of a polymer containing silane groups, determined by means of measurement in an inductively coupled plasma (ICP).

The zinc(II) complex used as catalyst or present in the composition is a zinc(II) complex of the formula $Zn_k(L)_x(Y)_{2k-nx}$ where k is an integer from 1 to 10, x is 1, 2, 3 or 4, n corresponds to the value of n in the formula (I) of the ligand L below, Y is a singly negatively charged ligand and L is a ligand of the formula (I)

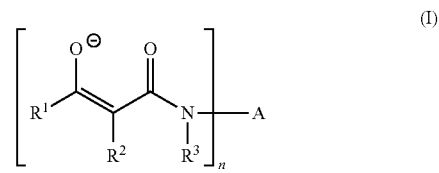

where
n is 1, 2 or 3,
A is $R^4$ or a polyoxyalkylene radical or a radical of a polyoxyalkylated compound optionally having one or two terminal 1,3-ketoamide groups of the formula

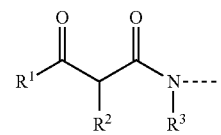

where $R^1$, $R^2$ and $R^3$ are as defined below,
$R^1$ and $R^2$ are each independently a hydrogen radical or a monovalent saturated or unsaturated hydrocarbyl radical having 1 to 10 carbon atoms or together are a divalent alkylene radical having 3 to 6 carbon atoms, and
$R^3$ and $R^4$ are each independently a hydrogen radical or a monovalent saturated hydrocarbyl radical which has 1 to 12 carbon atoms and optionally contains one or more heteroatoms or together are a divalent alkylene radical which has 3 to 6 carbon atoms and optionally contains one or more heteroatoms.

A can only be $R^4$ when n is 1.

The Zn(II) complex of the formula $Zn_k(L)_x(Y)_{2k-nx}$ with Zn as central atom and coordinatively bound ligands L of the formula (I) and optionally Y is uncharged. The index k is an integer from 1 to 10, preferably 1 to 5 and more preferably 1. The index x is 1, 2, 3 or 4, preferably 2. The index n corresponds to the value of n in the formula (I) of the ligand L. The value 2k−nx is preferably 0, meaning that preferably no Y ligands are present.

The ligand Y is any singly negatively charged ligand, preference being given to a singly negatively charged organic anion. Examples of the ligand are a halide such as chloride, a carboxylate such as acetate, octoate, neodecanoate or laurate, and preferably a carbonylate, more preferably a 1,3-dicarbonylate, for example acetylacetonate or 2,2,6,6-tetramethylheptane-3,5-dionate.

The ligand L of the formula (I), in a formal sense, has a negative charge delocalized over the 1,3-ketoamide structure. It can therefore be drawn in various resonance structures, for example in the resonance structures shown below. All possible resonance structures of the ligand L of the formula (I) are considered to be equivalent in the context of the present invention.

thus tends to be liquid or have good solubility. Most preferably, the alkyl radical having 1 to 4 carbon atoms is a methyl radical. The monovalent unsaturated hydrocarbyl radical having 1 to 10 carbon atoms is preferably an aryl radical, more preferably a phenyl radical. A divalent alkylene radical having 3 to 6 carbon atoms is understood to mean a radical of the formula —$(CH_2)_n$— where n is 3 to 6, preferably 3 to 4, and more preferably 3.

In a preferred embodiment, $R^1$ and $R^2$ together form a divalent alkylene radical having 3 to 4 carbon atoms, especially having 3 carbon atoms.

More preferably, $R^2$ is a hydrogen radical, since the metal complex thus tends to be particularly stable. If $R^1$ and $R^2$ together do not form an alkylene radical, $R^1$ is preferably a monovalent saturated or unsaturated hydrocarbyl radical having 1 to 10 carbon atoms, more preferably an alkyl

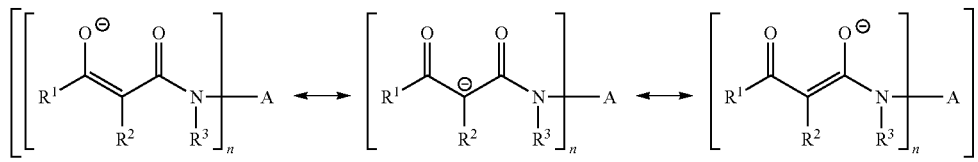

The index n in the formula (I) is 1, 2 or 3, preferably 1 or 2 and more preferably 1.

The ligands L of the formula (I) may be the same or different. More preferably, identical ligands L of the formula (I) are present if more than one ligand L is present.

In the formula (I), A is $R^4$ or a polyoxyalkylene radical or a radical of a polyoxyalkylated compound. $R^4$ is elucidated further hereinafter. The polyoxyalkylene radical or the radical of a polyoxyalkylated compound may optionally have one or two terminal 1,3-ketoamide groups of the formula

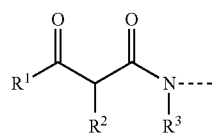

where $R^1$, $R^2$ and $R^3$ are as defined for the formula (I). The polyoxyalkylene radical or the radical of a polyoxyalkyleneylated compound preferably has a number-average molecular weight Mn of about 200 to 5000 g/mol and more preferably of about 200 to 2000 g/mol. It will be appreciated that Mn relates to the polyoxyalkylene or the polyoxyalkyleneylated compound. Examples of polyoxyalk or a polyoxyalkylated compound from which the radical is derived are polyoxyethylene, polyoxypropylene and mixed forms thereof, and polyethoxylated or polypropoxylated compounds having active hydrogen atoms, for example polyethoxylated or polypropoxylated amines, alcohols and glycols.

In the formula (I), $R^1$ and $R^2$ are each independently a hydrogen radical, a monovalent saturated or unsaturated hydrocarbyl radical having 1 to 10 carbon atoms, or together are a divalent alkylene radical having 3 to 6 carbon atoms.

The monovalent saturated hydrocarbyl radical having 1 to 10 carbon atoms is preferably an alkyl radical having 1 to 4 carbon atoms, especially methyl, propyl, isopropyl or butyl radical. These have the advantage that the metal complex radical having 1 to 4 carbon atoms or an aryl radical, more preferably a methyl, propyl, isopropyl, butyl or phenyl radical.

In the formula (I), $R^3$ and, if A is $R^4$, $R^4$ are each independently a hydrogen radical, a monovalent saturated hydrocarbyl radical which has 1 to 12 carbon atoms and optionally contains one or more heteroatoms or a benzyl radical, or together are a divalent alkylene radical which has 3 to 6 carbon atoms and optionally contains one or more heteroatoms.

The monovalent saturated hydrocarbyl radical which has 1 to 12 carbon atoms and optionally contains one or more heteroatoms is preferably an alkyl radical having 1 to 8 carbon atoms, more preferably a methyl, ethyl, propyl, isopropyl, butyl, isobutyl, 2-butyl, hexyl, 2-ethylpentyl, 2-ethylhexyl or octyl radical, a cycloalkyl radical having 5 to 6 carbon atoms, preferably having 6 carbon atoms, or an alkyl ether radical having 1 to 4 carbon atoms, more preferably a 2-methoxyethyl or a 2-(2-methoxy)ethoxyethyl radical. This has the advantage that the zinc(II) complex thus tends to be liquid or have good solubility.

More preferably, $R^3$ and $R^4$ are each independently a hydrogen radical, an alkyl radical having 1 to 8 carbon atoms, a cycloalkyl radical having 5 to 6 carbon atoms, an alkyl ether radical having 1 to 4 carbon atoms or a benzyl radical, where $R^3$ is preferably a hydrogen, methyl or isopropyl radical.

When $R^3$ and $R^4$ together are a divalent alkylene radical which has 3 to 6 carbon atoms and optionally contains one or more heteroatoms, they are preferably a divalent alkylene radical of the formula —$(CH_2)_m$—X—$(CH_2)_o$— with X=O, NR where R is a monovalent alkyl radical having 1 to 4 carbon atoms, or S and m and o are each independently an integer from 2 to 4, where the sum total of m and o is 4 to 6, it being particularly preferable that m and o are each 2 and X=O or NR.

In a particularly preferred embodiment, the ligand L of the formula (I) is a ligand L1 in which n is 1 and A is $R^4$;

$R^1$ is an alkyl radical having 1 to 4 carbon atoms, especially a methyl or butyl radical, or an aryl radical, especially a phenyl radical, and $R^2$ is a hydrogen radical; or $R^1$ and $R^2$ together are an alkyl radical having 3 to 4 carbon atoms, especially having 3 carbon atoms; and $R^3$ and $R^4$ are each independently an alkyl radical having 1 to 8 carbon atoms, more preferably a methyl, ethyl, propyl, isopropyl, butyl, isobutyl, hexyl, 2-methylpentyl, octyl or 2-ethylhexyl radical; or a cycloalkyl radical having 5 to 6 carbon atoms, more preferably 6 carbon atoms; or an alkyl ether radical having 1 to 4 carbon atoms, more preferably a 2-methoxyethyl or 2-(2-methoxy)-ethoxyethyl radical; or $R^3$ and $R^4$ together are a divalent alkylene radical of the formula —$(CH_2)_m$—X—$(CH_2)_o$— where X=O, NR where R is a monovalent alkyl radical having 1 to 4 carbon atoms, or S and m and o are each independently an integer from 2 to 4, where the sum total of m and o is 4 to 6, it being particularly preferable that m and o are each 2 and X=O or NR.

In a further particularly preferred embodiment, the ligand L of the formula (I) is a ligand L2 in which n is 1, 2 or 3, especially 1 or 2;

A is a polyoxyalkylene radical or a radical of a polyoxyalkylated compound, where the polyoxyalkylene radical or the radical of a polyoxyalkylated compound preferably has a number-average molecular weight Mn of about 200 to 5000 g/mol, and preferably of about 200 to 2000 g/mol;

$R^1$ is an alkyl radical having 1 to 4 carbon atoms, especially a methyl, propyl, isopropyl or butyl radical, or an aryl radical, especially a phenyl radical, and $R^2$ is a hydrogen radical; or $R^1$ and $R^2$ together are an alkylene radical having 3 to 4 carbon atoms, especially having 3 carbon atoms; and $R^3$ is a hydrogen radical, a monovalent saturated hydrocarbyl radical which has 1 to 12 carbon atoms and optionally contains one or more heteroatoms, or a benzyl radical.

Preferably, the zinc(II) complex of the formula $Zn_k(L)_x(Y)_{2k-nx}$ is a zinc(II) complex of the formula $Zn(L1)_x(Y)_{2-x}$ where the L1 ligand is as defined above. Preferably, x is 2, since these complexes are particularly stable. If two or more L1 ligands are present, especially when preferably two L1 ligands are present, they may be the same or different. More preferably, two identical L1 ligands are present.

Further preferably, the zinc(II) complex of the formula $Zn_k(L)_x(Y)_{2k-nx}$ is a zinc(II) complex of the formula $Zn_k(L2)_x(Y)_{2k-nx}$ where the L2 ligand is as defined above. Preferably, k is an integer from 1 to 5, more preferably 1, since these complexes tend to have a low viscosity and good solubility. Further preferably, n is 1 or 2, since these complexes tend to have a low viscosity and good solubility. If two or more L2 ligands are present, they may be the same or different.

The zinc(II) complex of the formula $Zn_k(L)_x(Y)_{2k-nx}$ is preferably prepared by reacting a 1,3-ketoamide of the formula

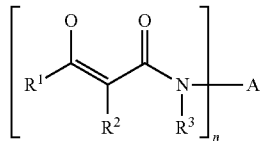

where $R^1$, $R^2$, $R^3$, A and n are as defined in formula (I) with a zinc(II) salt or a zinc(II) complex. Preference is given to the use of zinc chloride, zinc acetate and Zn(II) bis(acetylacetonate), particular preference to that of zinc(II) bis(acetylacetonate).

The 1,3-ketoamide may be used in a stoichiometric or preferably superstoichiometric amount in relation to its 1,3-ketoamide groups. Preferably, the stoichiometric ratio between the zinc(II) salt or zinc(II) complex and the 1,3-ketoamide groups is in the range from 1:2 to 1:6, more preferably from 1:2.2 to 1:4. In the case of superstoichiometric use of the 1,3-ketoamide, the zinc(II) complex of the formula $Zn_k(L)_x(Y)_{2k-nx}$ tends to have elevated hydrolysis stability and relatively low viscosity, and leads to elevated storage stability of the inventive composition.

The zinc(II) complex of the formula $Zn_k(L)_x(Y)_{2k-nx}$ is preferably prepared by mixing the zinc(II) salt or the zinc(II) complex with the 1,3-ketoamide and heating the mixture, preferably while stirring, to a temperature of 50 to 130° C., preferably about 90° C., for 1 to 24 hours, preferably about 3 hours. Subsequently, the reaction mixture is freed of volatile constituents, preferably under reduced pressure.

The 1,3-ketoamide used is preferably obtained by reacting an amine or polyetheramine with diketene or a 1,3-ketoester.

Preferred polyetheramines are polyoxyalkyleneamines, preferably having a number-average molecular weight Mn of about 200 to 5000 g/mol, as commercially available under the following trade names: Jeffamine® (from Huntsman), Polyetheramine (from BASF) or PC Amine® (from Nitroil). Particularly preferred products are Jeffamine® M-600, Jeffamine® M-1000, Jeffamine® M-2000, Jeffamine® M-2070, Jeffamine® XTJ-249, Jeffamine® XTJ-435, Jeffamine® XTJ-436, Jeffamine® XTJ-581, Jeffamine® D-230, Jeffamine® D-400, Jeffamine® D-2000, Jeffamine® D-4000, Jeffamine® XTJ-582, Jeffamine® XTJ-578, Jeffamine® HK-511, Jeffamine® ED-600, Jeffamine® ED-900, Jeffamine® ED-2003, Jeffamine® XTJ-568, Jeffamine® XTJ-569, Jeffamine® XTJ-533, Jeffamine® XTJ-536, Jeffamine® XTJ-542, Jeffamine® XTJ-548, Jeffamine® XTJ-559, Jeffamine® SD-231, Jeffamine® SD-401, Jeffamine® SD-2001, Jeffamine® T-403, Jeffamine® T-3000, Jeffamine® T-5000, Jeffamine® XTJ-566 and Jeffamine® ST-404 (all from Huntsman), and analogous products from BASF and Nitroil.

Particular preference is given to polyoxyalkyleneamines having a number-average molecular weight Mn of about 200 to 2000 g/mol. Very particular preference is given to polyoxypropyleneamines, especially polyoxypropylenemonoamines and polyoxypropylenediamines, which may contain proportions of other oxyalkylene units such as oxybutylene and especially oxyethylene units. Suitable polyoxypropylenemonoamines are especially the Jeffamine® M-600, Jeffamine® M-1000 and Jeffamine® XTJ-581 products. Suitable polyoxypropylenediamines are especially the Jeffamine® D-230, Jeffamine® D-400, Jeffamine® D-2000, Jeffamine® XTJ-582, Jeffamine® XTJ-578, Jeffamine® SD-231, Jeffamine® SD-401 and Jeffamine® SD-2001 products.

Preferred 1,3-ketoesters are alkyl acetoacetates, more preferably methyl acetoacetate, ethyl acetoacetate and tert-butyl acetoacetate.

Preferably, the 1,3-ketoamide is prepared by heating a mixture of the amine or polyetheramine and the diketene or the 1,3-ketoester, preferably while stirring, to a temperature of preferably 50 to 150° C., more preferably about 110° C., at 100 to 500 mbar, more preferably about 300 mbar, preferably for 1 to 20 hours, more preferably about 4 hours. Subsequently, the reaction mixture is freed of volatile constituents, preferably under reduced pressure.

The 1,3-ketoamide can preferably also be obtained by adding the diketene or the 1,3-ketoester, preferably gradually, to an amine or polyetheramine heated to preferably 80 to 160° C., more preferably about 130° C., and keeping the reaction mixture at 80 to 160° C., preferably about 130° C., preferably for a further 10 to 30 hours, more preferably about 18 hours. This is preferably followed by cooling to room temperature and freeing of the mixture of volatile constituents, preferably under reduced pressure. The residue obtained is preferably dissolved in ethyl acetate, and the solution is washed with hydrochloric acid, dried with magnesium sulfate and fully concentrated.

The composition further comprises at least one polymer containing silane groups. It is possible to use one or more polymers containing silane groups. The polymer contains at least one, preferably at least two, silane group(s). The polymer containing silane groups generally has an average of more than 1, preferably 1.3 to 4, preferably 1.5 to 3 and more preferably 1.7 to 2.8 silane group(s) per molecule. The silane groups are preferably terminal.

The polymer containing silane groups, for example the polyether containing silane groups or the polyether containing alkoxysilane groups, preferably has a number-average molecular weight in the range from 1000 to 30'000 g/mol, especially from 2000 to 20'000 g/mol. The polymer containing silane groups, for example the polyether containing silane groups or the polyether containing alkoxysilane groups, preferably has a silane equivalent weight of 300 to 25'000 g/eq, especially of 500 to 15'000 g/eq.

The silane groups in the polymer containing silane groups preferably have two or three, more preferably three, hydrolyzable radicals on the silicon atom. The hydrolyzable radicals may be the same or different; they are preferably the same.

The hydrolyzable radicals are especially alkoxy, acetoxy, ketoximato, amido or enoxy radicals having 1 to 13 carbon atoms. Preference is given to alkoxy radicals. Preferred alkoxy radicals have 1 to 4 carbon atoms. Particular preference is given to methoxy and ethoxy radicals.

The silane groups of the polymer containing silane groups are therefore preferably alkoxysilane groups, especially dialkoxysilane groups and more preferably trialkoxysilane groups. Preference is given to dimethoxysilane groups and diethoxysilane groups and particular preference to trimethoxysilane groups and triethoxysilane groups.

Preferred polymers containing silane groups are preferably the following polymers containing silane groups: polyethers, poly(meth)acrylates, polyolefins, polyesters, polyamides, polyurethanes or mixed forms of these polymers. Particular preference is given to polyethers, poly(meth)acrylates, polyolefins and polyesters containing silane groups, especially polyethers and poly(meth)acrylates containing silane groups. Most preferred are polyethers containing silane groups.

Particularly preferred polymers containing silane groups are the following polymers containing alkoxysilane groups: polyethers, poly(meth)acrylates, polyolefins, polyesters, polyamides, polyurethanes or mixed forms of these polymers. Particular preference is given to polyethers, poly(meth)acrylates, polyolefins and polyesters containing alkoxysilane groups, especially polyethers and poly(meth)acrylates containing alkoxysilane groups. Most preferred are polyethers containing alkoxysilane groups.

The polyether containing alkoxysilane groups contains, as structural units in the polymer chain, oxyalkylene units, preferably oxy($C_2$-$C_4$-alkylene) units such as oxyethylene, oxypropylene or oxybutylene units, particular preference being given to oxypropylene units. The polymer chain may contain one type of oxyalkylene units or a combination of two or more different oxyalkylene units which may be arranged in random distribution or preferably in blocks.

The polyether containing silane groups, preferably the polyether containing alkoxysilane groups, may have not only the oxyalkylene units but also functional groups in the polymer chain, especially urea groups, urethane groups, thiourethane groups, ester groups and/or amide groups, preferably urea groups and/or urethane groups. The functional groups may serve to extend the polymer chain and/or to attach the silane groups, preferably the alkoxysilane groups.

Particularly suitable polyethers containing silane groups, especially polyethers containing alkoxysilane groups, are derived from polyoxyalkylenepolyols, also called polyetherpolyols or oligoetherols, which are optionally chain-extended via the functional groups mentioned and/or to which may be attached functional groups for attachment of the alkoxysilane groups.

The polyoxyalkylenepolyols are preferably polymerization products of ethylene oxide, 1,2-propylene oxide, 1,2- or 2,3-butylene oxide, oxetane, tetrahydrofuran or mixtures thereof, possibly polymerized with the aid of a starter molecule having two or more active hydrogen atoms, for example water, ammonia or compounds having two or more OH or NH groups, for example ethane-1,2-diol, propane-1, 2- and -1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonane-diols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the aforementioned compounds. It is possible to use either polyoxyalkylenepolyols having a low degree of unsaturation (measured to ASTM D-2849-69 and reported in milliequivalents of unsaturation per g of polyol (meq/g)), prepared, for example, with the aid of what are called double metal cyanide complex catalysts (DMC catalysts), or polyoxyalkylenepolyols having a higher degree of unsaturation, prepared, for example, with the aid of anionic catalysts such as NaOH, KOH, CsOH or alkali metal alkoxides.

Particularly suitable are polyoxyalkylenediols or polyoxyalkylenetriols, especially polyoxyethylene- and polyoxypropylenedi- and -triols. Especially suitable are polyoxyalkylenediols and -triols having a degree of unsaturation of less than 0.02 meq/g and having a number-average molecular weight in the range from 1000 to 30'000 g/mol, and polyoxypropylenediols and -triols having a number-average molecular weight of 400 to 8000 g/mol.

Likewise particularly suitable are what are called ethylene oxide-terminated ("EO-endcapped", ethylene oxide-end-capped) polyoxypropylenepolyols. The latter are specific polyoxypropylenepolyoxyethylenepolyols which are obtained, for example, by further alkoxylating pure polyoxypropylenepolyols, especially polyoxypropylenediols and -triols, with ethylene oxide on completion of the polypropoxylation reaction and hence have primary hydroxyl groups.

The polymer containing silane groups is preferably obtainable from
    the copolymerization of (meth)acryloylsilanes with non-silane-functional (meth)acrylates and/or olefins, or
    the grafting of polyolefins or poly(meth)acrylates with vinylsilanes or (meth)acryloylsilanes, or the hydrosilylation of polymers having terminal allyl groups with hydrosilanes, or the Michael-like reaction of polymers having terminal (meth)acryloyl groups with aminosilanes or mercaptosilanes, or the reaction of polymers having silane groups from the copolymerization of alkylene oxides and epoxysilanes with polyisocyanates, or the reaction of polymers having terminal hydroxyl groups, especially polyols or OH-terminated polyurethane prepolymers, with isocyanatosilanes, or the reaction of polymers having terminal isocyanate groups, especially NCO-terminated polyurethane prepolymers (NCO prepolymers), with aminosilanes, hydroxysilanes or mercaptosilanes.

More preferably, the polymer containing silane groups is obtainable from the reaction of NCO prepolymers with aminosilanes or hydroxysilanes or mercaptosilanes.

Suitable NCO prepolymers are especially obtainable from the reaction of polyols with polyisocyanates, especially diisocyanates. The reaction can be effected by reacting the polyol and the polyisocyanate by customary methods, especially at temperatures of 50° C. to 100° C., optionally with additional use of suitable catalysts, especially amines, bismuth compounds or zinc compounds, with metered addition of the polyisocyanate in such a way that the isocyanate groups thereof are present in a stoichiometric excess in relation to the hydroxyl groups in the polyol. More particularly, the excess of polyisocyanate is chosen such that there remains, in the resulting polyurethane polymer after the conversion of all the hydroxyl groups in the polyol, a content of free isocyanate groups of 0.1% to 5% by weight, preferably 0.2% to 3% by weight, based on the overall NCO prepolymer. Preference is given to NCO prepolymers having said content of free isocyanate groups, which are obtained from the reaction of polyols with polyisocyanates in an NCO/OH ratio of 1.5/1 to 2.5/1, especially 1.8/1 to 2.2/1.

Suitable polyols for the preparation of the NCO prepolymer are standard commercial polyols, especially polyetherpolyols, polyesterpolyols, polycarbonatepolyols, poly(meth) acrylatepolyols and polyolefinpolyols, and mixed forms thereof. In addition to these polyols, it is also possible to use small amounts of low molecular weight di- or polyhydric alcohols.

Suitable polyisocyanates for the preparation of the NCO prepolymer are standard commercial polyisocyanates, especially diisocyanates, preferably hexamethylene 1,6-diisocyanate (HDI), 1-isocyanato-3,3,5-trimethyl-5-isocyanatomethylcyclohexane (=isophorone diisocyanate or IPDI), perhydrogenated diphenylmethane 2,4'- and 4,4'-diisocyanate (HMDI or $H_{12}$MDI), tolylene 2,4- and 2,6-diisocyanate and any desired mixtures of these isomers (TDI), diphenylmethane 4,4'-, 2,4'- and 2,2'-diisocyanate and any desired mixtures of these isomers (MDI), and mixtures of these polyisocyanates.

The reaction of the NCO prepolymer with the aminosilane or hydroxysilane or mercaptosilane is preferably conducted in such a way that the amino or hydroxyl or mercapto groups of the silane are present at least in stoichiometric amounts in relation to the isocyanate groups in the NCO prepolymer. The polymer containing silane groups which is thus formed is free of isocyanate groups, which is advantageous from a toxicological point of view. The reaction is preferably effected at a temperature in the range from 20° C. to 120° C., especially 40° C. to 100° C.

Suitable aminosilanes for conversion of the NCO prepolymer are primary and secondary aminosilanes. Preference is given to secondary aminosilanes, especially N-butyl (3-aminopropyl)trimethoxysilane and N-ethyl(3-amino-2-methylpropyl)trimethoxysilane, and adducts of primary aminosilanes, especially 3-aminopropyltrimethoxysilane and N-(2-aminoethyl)-3-aminopropyltrimethoxysilane, and Michael acceptors, especially acrylates and maleic diesters, and the analogs thereof having ethoxy groups in place of methoxy groups. Particularly preferred aminosilanes are the adducts of 3-aminopropyltrimethoxysilane or 3-aminopropyltriethoxysilane and diethyl maleate.

Suitable hydroxysilanes for conversion of the NCO prepolymer are especially hydroxysilanes having a secondary hydroxyl group. Preference is given to hydroxysilanes obtainable from the reaction of epoxides with secondary aminosilanes, or the reaction of epoxy silanes with secondary amines, or the reaction of primary aminosilanes with lactones or cyclic carbonates.

Suitable mercaptosilanes for conversion of the NCO prepolymer are especially 3-mercaptopropylsilanes, preferably 3-mercaptopropyltrimeth-oxysilane and 3-mercaptopropyltriethoxysilane.

Suitable commercially available polymers containing silane groups are available, for example, under the following brand names: EPION® (from Kaneka; polyisobutylene containing silane groups), XMAP™ (from Kaneka, SA100S, SA310S, SA420S products; poly(meth)acrylate containing silane groups), Gemlac™ (from Kaneka; poly(meth)acrylate silicone containing silane groups), Vestoplast® (from Evonik, 206, EP2403, EP2412 products; amorphous poly-alpha-olefin containing silane groups) and the polyethers containing alkoxysilane groups mentioned further down.

The preferred polyether containing silane groups, especially the polyether containing alkoxysilane groups, is preferably obtainable from the hydrosilylation of optionally chain-extended polyethers having terminal allyl groups with hydrosilanes, or the Michael-like reaction of optionally chain-extended polyethers having terminal (meth)acryloyl groups with aminosilanes or mercaptosilanes, or the reaction of polyethers having alkoxysilane groups from the copolymerization of alkylene oxides and epoxysilanes with polyisocyanates, or the reaction of optionally chain-extended polyethers having terminal hydroxyl groups, especially polyetherpolyols or OH-terminated polyether-polyurethane prepolymers, with isocyanatosilanes, or the reaction of optionally chain-extended polyethers having terminal isocyanate groups, especially NCO-terminated polyether-polyurethane prepolymers (polyether-NCO prepolymers), with aminosilanes, hydroxysilanes or mercaptosilanes.

More preferably, the polyether containing silane groups, especially the polyether containing alkoxysilane groups, is obtainable from the reaction of polyether-NCO prepolymers with aminosilanes or hydroxysilanes.

Suitable polyether-NCO prepolymers are especially obtainable from the reaction of polyetherpolyols, especially polyoxyalkylenediols or polyoxyalkylenetriols, preferably polyoxypropylenediols or polyoxypropylenetriols, with polyisocyanates. Suitable polyisocyanates and reaction conditions are those mentioned as suitable for the preparation of NCO prepolymers.

Especially suitable polyetherpolyols for preparation of the polyether-NCO prepolymer are polyoxyalkylenediols or polyoxyalkylenetriols having a degree of unsaturation lower than 0.02 meq/g, especially lower than 0.01 meq/g, and a number-average molecular weight in the range from 1000 to 20,000 g/mol, and polyoxypropylenediols and -triols having a number-average molecular weight of 400 to 8000 g/mol. Details of such polyetherpolyols have already been elucidated above. As well as polyetherpolyols, it is also possible to use proportions of other polyols, especially polyacrylatepolyols, and low molecular weight di- or polyhydric alcohols.

Suitable aminosilanes and hydroxysilanes for the conversion of the polyether-NCO prepolymers to the polyether containing silane groups, especially polyether containing alkoxysilane groups, are those mentioned as suitable for the conversion of NCO prepolymers.

Suitable commercially available polyethers containing alkoxysilane groups are available, for example, under the following brand names: MS Polymer™ (from Kaneka; S203H, S303H, S227, S810, MA903 and S943 products), MS Polymer™ or Silyl™ (from Kaneka; SAT010, SAT030, SAT200, SAX350, SAX400, SAX725, MAX450, MAX951 products), Excestar® (from Asahi Glass Co.; S2410, S2420, S3430, S3630 products), SPUR+* (from Momentive Performance Materials; 1010LM, 1015LM, 1050MM products), Vorasil™ (from Dow Chemical; 602 and 604 products), Desmoseal® (from Bayer Material Science; S XP 2458, S XP 2636, S XP 2749, S XP 2774 and S XP 2821 products), TEGOPAC® (from Evonik; Seal 100, Bond 150, Bond 250 products), Polymer ST (from Hanse Chemie, 47, 48, 61, 75, 77, 80, 81 products) and Geniosil® STP (from Wacker Chemie; E10, E15, E30, E35 products).

It is preferable that the composition of the invention is free of compounds containing isocyanate groups. The isocyanate group here includes free and blocked isocyanate groups. More particularly, the polymer containing silane groups preferably does not have any isocyanate group. The polymer containing silane groups is also preferably free of alcoholic OH groups bonded to a carbon atom.

The composition of the invention may further comprise one or more additives, for example those customary for silane-terminated polymers. Examples are additives selected from a base as cocatalyst, a plasticizer, a filler or a reinforcer, a rheology additive, a silane adhesion promoter or crosslinker, a desiccant and a stabilizer. It is possible for at least one or two or more of these optional additives or, if appropriate, a combination of all the additives mentioned to be present in the composition. The optional additives are elucidated in detail hereinafter.

For instance, the composition of the invention may preferably further comprise at least one base as cocatalyst, preferably a strong base. Preferred examples of suitable bases are an amidine, a guanidine or a phosphazene base. Particular preference is given to amidines and guanidines, especially 1,8-diazabicyclo[5.4.0]undec-7-ene (DBU) and 1,1,3,3-tetramethylguanidine (TMG).

The composition of the invention may further preferably comprise at least one plasticizer. Preferred examples of suitable plasticizers are esters of organic carboxylic acids or anhydrides thereof, such as phthalates, especially diisononyl phthalate or diisodecyl phthalate, hydrogenated phthalates, especially diisononyl cyclohexane-1,2-dicarboxylate, adipates, especially dioctyl adipate, azelates and sebacates, polyols, especially polyoxyalkylenepolyols or polyesterpolyols, organic phosphoric and sulfonic esters or polybutenes.

The composition of the invention may preferably further comprise at least one filler or reinforcer. Preferred examples of the filler or reinforcer are calcium carbonate such as ground or precipitated calcium carbonates optionally coated with stearates, especially finely divided coated calcium carbonate, carbon blacks, especially industrially produced carbon blacks which are referred to hereinafter as carbon black, and silicas, especially finely divided silicas from pyrolysis processes.

The composition of the invention may preferably further comprise at least one rheology additive, for example a urea compound, a polyamide wax or a fumed silica.

The composition of the invention may preferably further comprise at least one silane adhesion promoter or crosslinker. Preferred examples are an aminosilane, an epoxysilane, a (meth)acryloylsilane or oligomers of these silanes.

The composition of the invention may preferably further comprise at least one desiccant. Preferred examples are tetramethoxysilane, tetraethoxysilane, trimethoxymethylsilane, triethoxymethylsilane, trimethoxyvinylsilane, triethoxyvinylsilane, trimethoxyphenylsilane, triethoxyphenylsilane, α-functional silanes such as N-(silylmethyl)-O-methylcarbamates, especially N-(methyldimethoxysilylmethyl)-O-methylcarbamate, orthoformic esters, calcium oxide or molecular sieves.

The composition of the invention may further comprise at least one stabilizer against heat, light and UV radiation.

The composition of the invention may have been formulated in one-pack or multipack form, especially in two-pack form. It has preferably been formulated in one-pack form.

The composition of the invention is preferably a potting compound, a molding compound, a sealant, an adhesive, a coating composition, a primer or a spackling compound.

Preferred fields of use of the composition of the invention are as sealants, adhesives and coating compositions for paints, lacquers, coverings and coatings for construction and industrial applications.

The composition of the invention may be used in many fields, for example as a sealant, adhesive, covering, coating, lacquer, undercoat, potting compound, molding, film or membrane for construction and industrial applications, for example as a seam seal, cavity seal, joint sealant, assembly adhesive, bodywork adhesive, glazing adhesive, sandwich element adhesive, laminating adhesive, laminate adhesive, packaging adhesive, wood adhesive, parquet adhesive, anchoring adhesive, floor covering and coating, balcony and roof coating, concrete protection coating, parking garage coating, pipe coating, anticorrosion coating, textile coating, primer, damping element, sealing element, spackling compound, etc.

After the curing of the composition by moisture, a product which is obtained from the cured composition may comprise bonded, sealed or coated articles or substrates, the cured composition preferably being an elastic polymer. The invention therefore also relates to a product comprising a composition of the invention in cured form. The cured composition is preferably an elastic polymer.

There follow examples for further elucidation of the invention, but these are not intended to restrict the invention in any way.

EXAMPLES

Description of the Test Methods

Infrared spectra were recorded on a Perkin-Elmer 1600 FT-IR instrument (horizontal ATR measurement unit with ZnSe crystal; measurement window 4000-650 cm$^{-1}$). Liquid samples were applied neat as films; solid samples were dissolved in $CH_2Cl_2$. The absorption bands are reported in wavenumbers ($cm^{-1}$).

$^1$H NMR spectra were recorded on a Bruker DPX-300 spectrometer at 300.13 MHz; the chemical shifts δ are reported in ppm relative to tetramethylsilane (TMS). No distinction was made between true coupling and pseudo-coupling patterns.

The viscosity was measured on a thermostated Physica MCR 300 cone-plate viscometer (cone diameter 20 mm, cone angle 1°, cone tip-plate distance 0.05 mm, shear rate 0.1 to 100 s$^{-1}$) at a temperature of 20° C.

Standard climatic conditions are understood to mean a temperature of 23±1° C. and 50±5% relative air humidity.

Skinning time (ST) was determined by applying a few grams of the composition to cardboard in a layer thickness of about 2 mm and, under standard climatic conditions, measuring the duration until there were for the first time no residues remaining on an LDPE pipette used to gently tap the surface of the composition.

The surface quality was tested by touch after a curing time of 24 h under standard climatic conditions.

Tensile strength, elongation at break and modulus of elasticity (at 0-5% and at 0-100% elongation) were measured to DIN EN 53504 at a pulling speed of 200 mm/min.

Preparation of Zinc(II) Complexes of the Formula $Zn_k(L)_x(Y)2_{k-nx}$

Catalyst 1

In a round-bottom flask, 2.70 g of dried zinc(II) bis(acetylacetonate) and 5.65 g of N,N-dibutyl-3-oxoheptanamide (about 2 molar equivalents) were mixed and the mixture was heated to 80° C. while stirring for 3 hours. Thereafter, the reaction mixture was freed of the volatile constituents under reduced pressure. This gave 6.25 g of a yellow oil.

$^1$H NMR (CDCl$_3$): δ 0.8-1.0 (m, 18H, $CH_3CH_2$), 1.25-1.4 (m, 12H, $CH_3CH_2$), 1.45-1.65 (m, 12H, $CH_2CH_2CH_3$), 2.1-2.2 (t, 4H, $CH_2CO$), 3.1-3.2 (m, 4H, $NCH_2$), 3.25-3.35 (m, 4H, $NCH_2$), 4.75 (s, 2H, CHCO).

FT-IR: 2954, 2929, 2870, 1552, 1511, 1461, 1430, 1393, 1369, 1290, 1223, 1102, 951, 768, 731.

Catalyst 2

In a round-bottom flask, 5.68 g of dried zinc(II) bis(acetylacetonate) and 22.33 g of N,N-dibutyl-3-oxo-3-phenylpropanamide (about 4 molar equivalents) were mixed and the mixture was heated to 80° C. while stirring for 3 hours. Thereafter, the reaction mixture was freed of the volatile constituents under reduced pressure. This gave 23.83 g of an orange oil.

FT-IR: 2957, 2930, 2871, 1690, 1623, 1586, 1574, 1550, 1499, 1483, 1466, 1367, 1292, 1266, 1212, 1148, 1111, 1085, 1021, 969, 915, 760, 716, 690.

Catalyst 3

In a round-bottom flask, 2.53 g of zinc(II) bis(acetylacetonate) hydrate (contains about 2 equivalents of water) and 17.99 g of ligand L2-1 (see below, about 3 molar equivalents) were mixed and the mixture was heated to 90° C. while stirring for 3 hours. Thereafter, the reaction mixture was freed of the volatile constituents under reduced pressure. This gave 18.24 g of a pale yellow oil. FT-IR: 3325, 2968, 2867, 1652, 1547, 1450, 1372, 1341, 1298, 1263, 1096, 1015, 964, 925, 866, 782.

Ligand L2-1 was prepared beforehand as follows:

In a round-bottom flask, 22.39 g of tert-butyl acetoacetate were added gradually to 62.33 g of a polyetheramine (Jeffamine® M-600 from Huntsman) heated to 130° C. and the reaction mixture was kept at 130° C. for a further 18 hours. Thereafter, it was cooled to room temperature and freed of the volatile constituents under reduced pressure. The residue obtained was dissolved in ethyl acetate, and the solution was washed with hydrochloric acid solution (0.1 M), dried with MgSO$_4$ and concentrated fully. This gave 58.14 g of a pale yellow oil.

FT-IR: 3323, 2969, 2867, 1720, 1649, 1547, 1452, 1371, 1342, 1297, 1095, 1013, 924, 817.

Catalyst 4

In a round bottom flask, 1.33 g of zinc(II) bis(acetylacetonate) hydrate (contains about 2 equivalents of water) and 15.57 g of ligand L2-2 (see below, about 3 molar equivalents of 1,3-ketoamide groups) were mixed and the mixture was heated to 90° C. while stirring for 3 hours. Thereafter, the reaction mixture was freed of the volatile constituents under reduced pressure. This gave 16.15 g of a pale yellow oil.

FT-IR: 2969, 2930, 2866, 1718, 1637, 1587, 1517, 1450, 1372, 1341, 1296, 1259, 1094, 1014, 925, 866, 768.

Ligand L2-2 was prepared beforehand as follows:

In a round bottom flask, a mixture of 41.92 g of a polyetheramine (Jeffamine® SD-2001 from Huntsman) and 7.80 g of tert-butyl acetoacetate was heated to 110° C. while stirring at 300 mbar for about 4 hours. Thereafter, the reaction mixture was freed of the volatile constituents under reduced pressure. This gave 45.37 g of a pale yellow oil.

FT-IR: 2939, 2868, 1737, 1589, 1202, 1449, 1371, 1269, 1217, 1092, 934, 906, 868, 800, 772.

Preparation of Polymers Containing Silane Groups

Polyether STP-1 Containing Alkoxysilane Groups

With exclusion of moisture, 1000 g of Acclaim® 12200 polyol (polyoxypropylenediol having a low degree of unsaturation, from Bayer; OH number 11.0 mg KOH/g), 43.6 g of isophorone diisocyanate (IPDI; Vestanat® IPDI, from Evonik), 126.4 g of diisodecyl phthalate (DIDP) and 0.1 g of bismuth tris(neodecanoate) (10% by weight in DIDP) were heated to 90° C. while stirring constantly and left at this temperature until the content of free isocyanate groups, determined by titrimetric means, had reached a stable value of 0.63% by weight. Subsequently, 63.0 g of diethyl N-(3-trimethoxysilylpropyl)amino-succinate (adduct formed from 3-aminopropyltrimethoxysilane and diethyl maleate; prepared according to the instructions given in U.S. Pat. No. 5,364,955) were mixed in and the mixture was stirred at 90° C. until it was no longer possible to detect any free isocyanate by means of FT-IR spectroscopy. The polyether containing trimethoxysilane groups thus obtained, having a silane equivalent weight of about 6880 g/eq (calculated from the amounts used), was cooled to room temperature and kept with exclusion of moisture.

Polyether STP-2 Containing Alkoxysilane Groups

With exclusion of moisture, 1000 g of Acclaim® 12200 polyol (polyoxypropylenediol having a low degree of unsaturation, from Bayer; OH number 11.0 mg KOH/g), 43.6 g of isophorone diisocyanate (IPDI; Vestanat® IPDI, from Evonik), 126.4 g of diisodecyl phthalate (DIDP) and 0.1 g of bismuth tris(neodecanoate) (10% by weight in DIDP) were heated to 90° C. while stirring constantly and left at this temperature until the content of free isocyanate groups, determined by titrimetric means, had reached a stable value of 0.64% by weight. Subsequently, 70.6 g of diethyl N-(3-triethoxysilylpropyl)amino-succinate (adduct formed from 3-aminopropyltriethoxysilane and diethylmaleate) were mixed in and the mixture was stirred at 90° C.

until it was no longer possible to detect any free isocyanate by means of FT-IR spectroscopy. The polyether containing triethoxysilane groups thus obtained, having a silane equivalent weight of about 6920 g/eq (calculated from the amounts used), was cooled to room temperature and kept with exclusion of moisture.

Use of Zinc(II) Complexes in Polymer Containing Silane Groups and Corresponding Compositions Examples 1 to 4 and Comparative Examples V1 to V4

A composition composed of 96.5 parts by weight of polyether STP-1 containing alkoxysilane groups, 0.5 part by weight of vinyltrimethoxysilane (VTMO) and 3.0 parts by weight of 3-aminopropyltrimethoxysilane (AMMO) was blended with various catalysts according to table 1 below and the mixture was tested for viscosity and skinning time (ST) under standard climatic conditions, before and after storage. The skinning time was considered to be a measure of the activity of the catalyst in relation to the crosslinking reaction of the silane groups, i.e. of the crosslinking rate. The increase in viscosity and the skinning time was considered to be a measure of storage stability. The results are likewise reproduced in table 1.

Catalysts used were the catalysts 1 and 2 prepared above, with or without addition of a base as cocatalyst. For comparison, a corresponding composition without catalyst or with comparative Tyzor® IBAY (bis(ethylacetoacetato)-diisobutoxytitanium(IV), from DuPont), Zn(neodecanoate)$_2$ (zinc(II) bis-neodecanoate) and Zn(acac)$_2$ (zinc(II) bis(acetylacetonate)) catalysts was tested (comparative examples 1 to 4, referred to as V1 to V4).

TABLE 1

| Ex. | Catalyst | Conc.[1] | Viscosity[2] fresh | Viscosity[2] stored[3] | Increase in viscosity | ST (min) fresh | ST (min) stored[3] |
|---|---|---|---|---|---|---|---|
| V1 | — | — | 32.7 | 30.4 | −7% | 100 | 120 |
| V2 | Tyzor® IBAY | 2.0 | 40.4 | 49.5 | 23% | 45 | 100 |
| V3 | Zn(neodecanoate)$_2$ | 2.0 | 31.9 | 32.2 | 1% | 65 | 90 |
| V4 | Zn(acac)$_2$[4] | 2.0 | 31.5 | 45.7 | 45% | 58 | 90 |
| 1 | Catalyst 1 | 2.0 | 32.5 | 54.7 | 68% | 37 | 51 |
| 2 | Catalyst 2 | 2.0 | 32.3 | 38.2 | 18% | 42 | 50 |
| 3 | Catalyst 2 DBU | 1.0 0.5 | 30.5 | 38.3 | 26% | 37 | 46 |
| 4 | Catalyst 2 P$_1$—tBu-tris | 1.0 0.5 | 32.2 | 34.4 | 7% | 30 | 52 |

[1]mmol of metal atoms or amidine groups or phosphazene groups per 100 g of polyether STP-1 containing alkoxysilane groups
[2]in Pa · s.
[3]for 7 days at 60° C. in a closed container
[4]as a solution (20% by weight) in N-methylpyrrolidone.

The zinc(II) complexes of the formula $Zn_k(L)_x$, $(Y)_{2k-nx}$ used have a higher activity (per molar equivalent) than the comparative Tyzor® IBAY, Zn(neodecanoate)$_2$ and Zn(acac)$_2$ catalysts. The activity can be enhanced by combination with DBU (1,8-diazabicyclo[5.4.0]undec-7-ene) or P$_1$-tBu-tris (=P$_1$-tBu-tris(tetramethylene), a phosphazene base). Storage stability is likewise better in some cases, especially for catalyst 2, where the ligand L is present in excess.

Examples 5 to 8 and Comparative Examples V5 to V8

A composition composed of 95.9 parts by weight of polyether STP-2 containing alkoxysilane groups, 0.4 part by weight of vinyltriethoxysilane (VTEO) and 3.7 parts by weight of N-(2-aminoethyl)-3-aminopropyltriethoxysilane (DAEO) was blended with various catalysts according to table 2 below and the mixture was tested as described above for viscosity and skinning time (ST) and additionally for surface quality after a curing time of 24 h under standard climatic conditions. Comparative examples are identified as V5 to V8.

TABLE 2

| Ex. | Catalyst | Conc.[1] | Viscosity[2] fresh | Viscosity[2] stored[3] | Increase in viscosity | ST fresh | ST stored[3] | Surface after 24 h |
|---|---|---|---|---|---|---|---|---|
| V5 | DBTDL | 0.4 | 65.2 | 68.9 | 6% | 3 h 10' | 3 h 30' | slightly tacky |
| V6 | Tyzor® IBAY | 3.3 | 80.2 | 81.6 | 2% | 24 h | 24 h | very tacky |
| V7 | Tyzor® IBAY DBU | 1.6 1.6 | 65.4 | 71.5 | 9% | 2 h 10' | 5 h | tacky |
| V8 | Zn(acac)$_2$[4] | 3.3 | 58.5 | 69.7 | 19% | 5 h 30' | 5 h 40' | tacky |
| 5 | Catalyst 1 | 3.3 | 59.9 | 69.8 | 17% | 3 h 05' | 8 h | slightly tacky |
| 6 | Catalyst 2 | 3.3 | 60.2 | 63.7 | 6% | 4 h | 4 h | slightly tacky |
| 7 | Catalyst 1 DBU | 1.6 1.6 | 64.3 | 69.5 | 8% | 2 h 10' | 2 h 50' | dry |
| 8 | Catalyst 2 DBU | 1.6 1.6 | 61.1 | 68.4 | 12% | 2 h 45' | 2 h 50' | dry |

[1]mmol of metal atoms or amidine groups or phosphazene groups per 100 g of polyether STP-2 containing alkoxysilane groups
[2]in Pa · s
[3]for 7 days at 60° C. in a closed container
[4]as a solution (20% by weight) in N-methylpyrrolidone.

The zinc(II) complexes of the formula $Zn_k(L)_x(Y)_{2k-nx}$ used, in the slow-crosslinking polyether containing triethoxysilane groups, have a much higher activity (per molar equivalent) than the comparative Tyzor IBAY and $Zn(acac)_2$ catalysts. In combination with DBU, much shorter skinning times are even achieved than with the organotin catalyst DBTDL (dibutyltin(IV) dilaurate). It becomes clear from the surface tack that the crosslinking of the comparative mixtures with Tyzor® IBAY and $Zn(acac)_2$ is still not yet complete after 24 h. With the zinc(II) complexes of the formula $Zn_k(L)_x(Y)_{2k-nx}$, in contrast, the surface has only low tack after 24 h, similarly to DBTDL or even better.

Examples 9 to 12 and Comparative Examples V9 to V12

In a planetary mixer, 37.6 parts by weight of polyether STP-1 containing alkoxysilane groups, 60.0 parts by weight of ground chalk (Omyacarb® 5 GU), 1.2 parts by weight of vinyltrimethoxysilane (VTMO), 1.2 parts by weight of 3-aminopropyltrimethoxysilane (AMMO) and various catalysts according to table 3 below were blended and the mixture was tested for skinning time (ST) under standard climatic conditions. In addition, the mixture was used to produce a film of thickness 2 mm which was left to cure under standard climatic conditions for 7 days and tested for mechanical properties. The comparative examples are identified as V9 to V12.

TABLE 3

| Ex. | Catalyst | Conc.[1] | ST | Tensile strength (MPa) | Elongation at break | Modulus of elasticity 0-5% (MPa) | Modulus of elasticity 0-100% (MPa) |
|---|---|---|---|---|---|---|---|
| V9 | — | — | 3 h | 2.4 | 130% | 4.8 | 2.2 |
| V10 | Tyzor® IBAY | 1.2 | 40' | 2.4 | 140% | 4.5 | 2.2 |
| V11 | Zn(neo-decanoate)$_2$ | 1.2 | 92' | 3.2 | 110% | 6.0 | 3.1 |
| V12 | Zn(acac)$_2$[2] | 1.2 | 52' | 2.9 | 130% | 5.2 | 2.6 |
| 9 | Catalyst 1 | 1.2 | 22' | 2.5 | 170% | 4.4 | 2.2 |
| 10 | Catalyst 2 | 1.2 | 40' | 2.7 | 150% | 4.5 | 2.4 |
| 11 | Catalyst 2 DBU | 0.6 0.4 | 28' | 2.6 | 120% | 5.0 | 2.5 |
| 12 | Catalyst 2 P$_1$—tBu-tris | 0.6 0.4 | 20' | 2.7 | 130% | 5.1 | 2.5 |

[1]mmol of metal atoms or amidine groups or phosphazene groups per 100 g of polyether STP-1 containing alkoxysilane groups
[2]as a solution (20% by weight) in N-methylpyrrolidone.

The compositions of the invention comprising a zinc(II) complex of the formula $Zn_k(L)_x(Y)_{2k-nx}$ as catalyst cure rapidly to give a material of good mechanical elasticity.

Examples 13 to 15

In a planetary mixer, 70.8 parts by weight of polyether STP-1 containing alkoxysilane groups, 27.5 parts by weight of ground chalk (Omyacarb® 5 GU), 0.3 part by weight of vinyltrimethoxysilane (VTMO), 1.4 parts by weight of 3-aminopropyltrimethoxysilane (AMMO) and catalysts 2, 3 and 4 as prepared above were blended according to table 4 below and the mixture was tested for skinning time (ST) under standard climatic conditions. In addition, the mixture was used to produce a film of thickness 2 mm which was left to cure under standard climatic conditions for 7 days and tested for mechanical properties.

TABLE 4

| Ex. | Catalyst | Conc.[1] | ST | Tensile strength (MPa) | Elongation at break | Modulus of elasticity 0-5% (MPa) | Modulus of elasticity 0-100% (MPa) |
|---|---|---|---|---|---|---|---|
| 13 | Catalyst 2 DBU | 0.27 0.20 | 37' | 1.6 | 160% | 1.8 | 0.9 |
| 14 | Catalyst 3 DBU | 0.27 0.20 | 54' | 1.5 | 160% | 1.8 | 0.9 |
| 15 | Catalyst 4 DBU | 0.27 0.20 | 60' | 1.6 | 170% | 1.8 | 0.9 |

[1]mmol of metal atoms or amidine groups or phosphazene groups per 100 g of polyether STP-1 containing alkoxysilane groups The compositions of the invention comprising a zinc(II) complex of the formula $Zn_k(L)_x(Y)_{2k-nx}$ in the form of the preferred zinc(II) complex $Zn(L1)_x(Y)_{2-x}$ (example 13) or the preferred zinc(II) complex $Zn_k(L2)_x(Y)_{2k-nx}$ (examples 14 and 15) as catalyst in combination with DBU cure at comparable speed to give a material of good mechanical elasticity.

The invention claimed is:

1. A method of catalyzing a crosslinking reaction, the method comprising providing a zinc(II) complex of the formula $Zn_k(L)_x(Y)_{2k-nx}$ where k is an integer from 1 to 10, x is 1, 2, 3 or 4, n corresponds to the value of n in the formula (I) of the ligand L below, Y is a singly negatively charged ligand and L is a ligand of the formula (I)

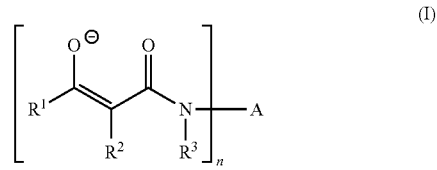

(I)

where n is 1, 2 or 3,
A is $R^4$ or a polyoxyalkylene radical or a radical of a polyoxyalkylated compound optionally having one or two terminal 1,3-ketoamide groups of the formula

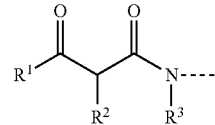

where $R^1$, $R^2$ and $R^3$ are as defined below,
$R^1$ and $R^2$ are each independently a hydrogen radical or a monovalent saturated or unsaturated hydrocarbyl radical having 1 to 10 carbon atoms or together are a divalent alkylene radical having 3 to 6 carbon atoms, and
$R^3$ and $R^4$ are each independently a hydrogen radical or a monovalent saturated hydrocarbyl radical which has 1 to 12 carbon atoms and optionally contains one or more heteroatoms or together are a divalent alkylene radical which has 3 to 6 carbon atoms and optionally contains one or more heteroatoms,
as a catalyst for the crosslinking of polymers containing silane groups by means of moisture.

2. A composition comprising:
at least one polymer containing silane groups; and
at least one zinc(ll) complex of the formula $Zn_k(L)_x(Y)_{2k-nx}$ where k is an integer from 1 to 10, x is 1, 2, 3 or 4, n corresponds to the value of n in the formula (I) of the ligand L below, Y is a singly negatively charged ligand and L is a ligand of the formula (I)

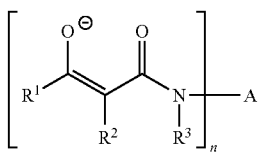

where n is 1, 2 or 3,
A is $R^4$ or a polyoxyalkylene radical or a radical of a polyoxyalkylated compound optionally having one or two terminal 1,3-ketoamide groups of the formula

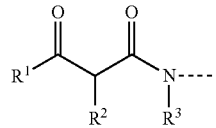

where $R^1$, $R^2$ and $R^3$ are as defined below,
$R^1$ and $R^2$ are each independently a hydrogen radical or a monovalent saturated or unsaturated hydrocarbyl radical having 1 to 10 carbon atoms or together are a divalent alkylene radical having 3 to 6 carbon atoms, and
$R^3$ and $R^4$ are each independently a hydrogen radical or a monovalent saturated hydrocarbyl radical which has 1 to 12 carbon atoms and optionally contains one or more heteroatoms or together are a divalent alkylene radical which has 3 to 6 carbon atoms and optionally contains one or more heteroatoms.

3. The composition as claimed in claim 2, wherein the ligand L of the formula (I) is a ligand L1 in which:
n is 1 and A is $R^4$;
$R^1$ is an alkyl radical having 1 to 4 carbon atoms or an aryl radical and $R^2$ is a hydrogen radical, or $R^1$ and $R^2$ together are an alkylene radical having 3 to 4 carbon atoms; and
$R^3$ and $R^4$ are each independently an alkyl radical having 1 to 8 carbon atoms or a cycloalkyl radical having 5 to 6 carbon atoms or an alkyl ether radical having 1 to 4 carbon atoms, or $R^3$ and $R^4$ together are a divalent alkylene radical of the formula —$(CH_2)_m$—X—$(CH_2)_o$— where X=O, NR in which R is a monovalent alkyl radical having 1 to 4 carbon atoms, or S and m and o are each independently an integer from 2 to 4, where the sum total of m and o is 4 to 6.

4. The composition as claimed in claim 3, wherein the zinc(II) complex has the formula $Zn(L1)_x(Y)_{2-x}$ where x is 2.

5. The composition as claimed in claim 2, wherein the ligand L of the formula (I) is a ligand L2 in which:
n is 1, 2 or 3;
A is a polyoxyalkylene radical or a radical of a polyoxyalkylated compound;
$R^1$ is an alkyl radical having 1 to 4 carbon atoms or an aryl radical and $R^2$ is a hydrogen radical, or $R^1$ and $R^2$ together are an alkylene radical having 3 to 4 carbon atoms; and $R^3$ is a hydrogen radical, a monovalent saturated hydrocarbyl radical which has 1 to 12 carbon atoms and optionally contains one or more heteroatoms, or a benzyl radical.

6. The composition as claimed in claim 5, wherein the zinc(II) complex has the formula $Zn_k(L2)_x(Y)_{2k-nx}$ where k is an integer from 1 to 5.

7. The composition as claimed in claim 2, wherein the polymer containing silane groups has an average in a range of 1.3 to 4 silane groups per molecule.

8. The composition as claimed in claim 2, wherein the polymer containing silane groups has a number-average molecular weight Mn, measured by means of GPC against a polystyrene standard, in a range of 1,000 to 30,000 g/mol.

9. The composition as claimed in claim 2, wherein the polymer containing silane groups is formed by:
copolymerization of (meth)acryloylsilanes with non-silane-functional (meth)acrylates and/or olefins,
grafting of polyolefins or poly(meth)acrylates with vinylsilanes or (meth)acryloylsilanes,
hydrosilylation of polymers having terminal allyl groups with hydrosilanes,
Michael reaction of polymers having terminal (meth)acryloyl groups with aminosilanes or mercaptosilanes,
reaction of polymers having silane groups from the copolymerization of alkylene oxides and epoxysilanes with polyisocyanates,
reaction of polymers having terminal hydroxyl groups with isocyanatosilanes, or
reaction of polymers having terminal isocyanate groups with aminosilanes, hydroxysilanes or mercaptosilanes.

10. The composition as claimed in claim 2, wherein the polymer containing silane groups is a polyether containing silane groups, or formed from:
hydrosilylation of optionally chain-extended polyethers having terminal allyl groups with hydrosilanes,
Michael reaction of optionally chain-extended polyethers having terminal (meth)acryloyl groups with aminosilanes or mercaptosilanes,
reaction of polyethers having alkoxysilane groups from the copolymerization of alkylene oxides and epoxysilanes with polyisocyanates,
reaction of optionally chain-extended polyethers having terminal hydroxyl groups with isocyanatosilanes, or
reaction of optionally chain-extended polyethers having terminal isocyanate groups with aminosilanes, hydroxysilanes or mercaptosilanes.

11. The composition as claimed in claim 10, wherein the polyether containing silane groups has oxyalkylene units in the polymer chain and at least one functional group selected from the group consisting of urea groups, urethane groups, thiourethane groups, ester groups and amide groups.

12. The composition as claimed in claim 2, wherein the composition comprises at least one additive selected from the group consisting of a base as cocatalyst, a plasticizer, a filler or reinforcer, a rheology additive, a silane adhesion promoter or crosslinker, a desiccant and a stabilizer.

13. The composition as claimed in claim 2, wherein the composition is a one-pack or multipack.

14. The composition as claimed in claim 2, wherein the composition is selected from the group consisting of a potting compound, a molding compound, a sealant, an adhesive, a coating composition, a primer and a spackling compound.

15. A product comprising a cured composition, wherein the composition is a composition as claimed in claim 2, and the cured composition is an elastic polymer.

* * * * *